United States Patent Office 3,264,960
Patented August 9, 1966

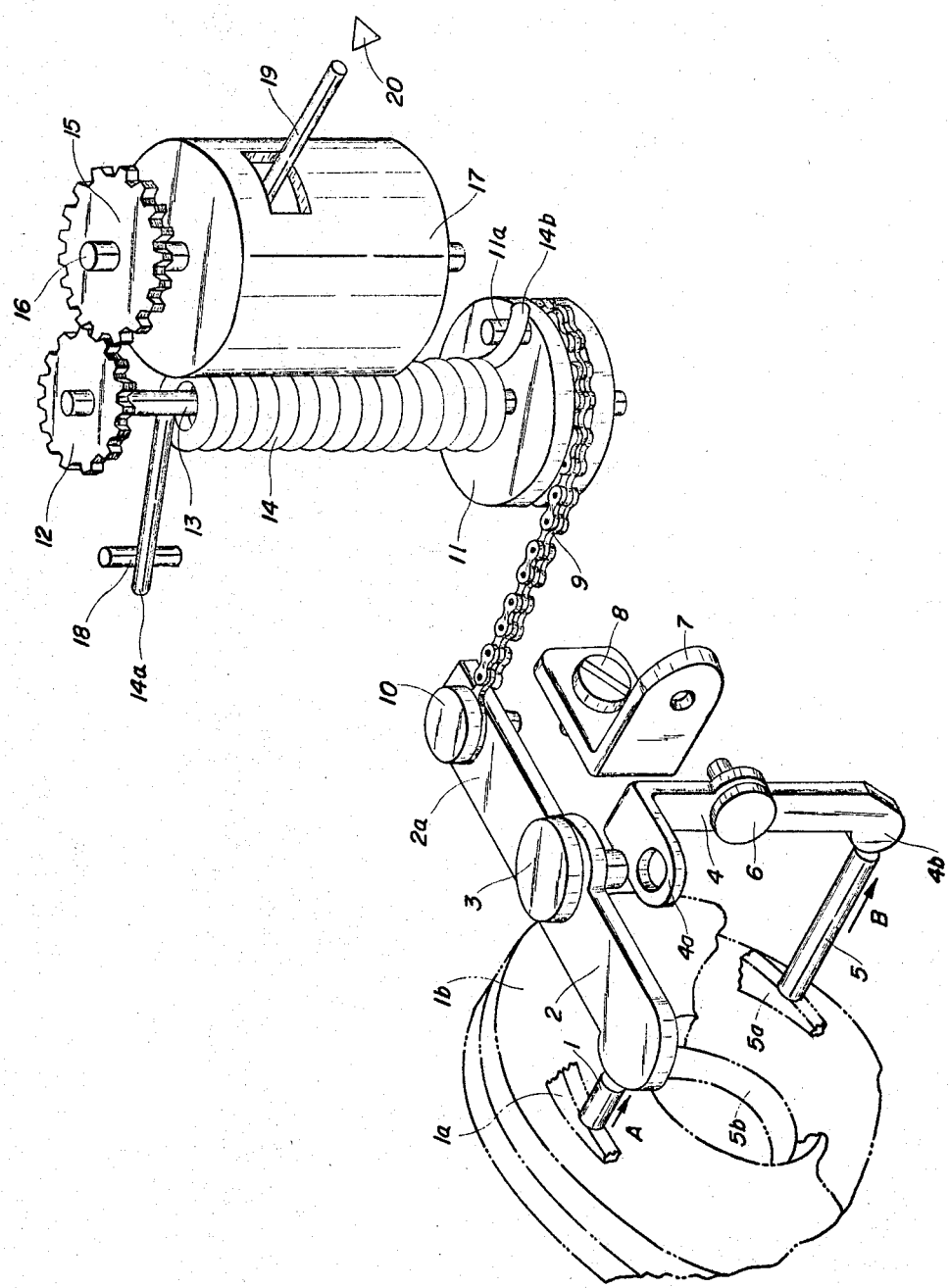

---

3,264,960
PHOTOELECTRIC EXPOSURE CONTROL SYSTEMS FOR CAMERAS
Helmut Ettischer, Ruit, Fildern, Germany, assignor to Eastman Kodak Company, Rochester, N.Y., a corporation of New Jersey
Filed Nov. 27, 1963, Ser. No. 326,414
4 Claims. (Cl. 95—10)

The present invention relates to a differential coupling between a photoelectric exposure meter and a camera diaphragm and shutter, according to the follow-up principle.

It is well known to couple the exposure meter of a camera with the setting members for diaphragm and exposure time, by means of a differential gearing or by means of rotatable and slidable rings arranged coaxially to the shutter.

An object of this invention is to effect such coupling by means of a smaller, simpler, less expensive, yet more rugged and precise mechanism.

Other objects of the invention will appear from the following description, reference being made to the accompanying drawing, which is a perspective view of the coupling mechanism.

Referring to the drawing, one end of the first push rod 1 abuts a cam 1a, which is integral with the exposure time setting member 1b of the camera. The other end of rod 1 rests against a first lever 2, which is pivoted by means of a bolt 3 engaging a circular aperture 4a of a second lever 4. A second push rod 5 has one end abutting a cam 5a, which is integral with the diaphragm setting member 5b, and has its other end abutting an ear 4b of lever 4. Lever 4 is pivotally mounted by a bolt 6 on a bracket 7, which is fastened to the camera housing or lens mount (not shown) by means of a screw 8. Setting members 1b and 5b are mounted coaxially with the objective lens axis of the camera in a well known manner. As shown in the drawing, levers 2 and 4 are located adjacent the face of the setting members 1b and 5b as distinguished from the peripheral edge.

One end of a link chain 9 is connected with an arm 2a of lever 2 by means of a bolt 10. The other end of chain 9 passes around a roll 11 and is fastened thereto. Roll 11 and a gear 12 are secured to a shaft 13, which serves also as a support for a spring 14. Gear 12 meshes with a gear 15, which is secured to an axle 16 of a measuring instrument 17. Shanks 14a and 14b of spring 14 rest against pins 18 and 11a. By action of spring 14, levers 2 and 4 are pressed against push rods 1 and 5, respectively, and these against cams 1a and 5a, respectively. In a well known manner, the instrument pointer 19 cooperates with an index mark 20, giving the camera operator a visual indication of the proper combined setting of the diaphragm and shutter or the extent to which they need to be adjusted for proper exposure.

The device operates as follows:

When the exposure time is set at the shutter, push rod 1 is moved, for example in the direction of arrow A, thereby pivoting lever 2 counterclockwise. Roll 11 is turned clockwise by chain 9 against the tension of spring 14, which causes measuring instrument 17 to turn counterclockwise, thereby changing the relation between pointer 19 and mark 20 to compensate for the resetting of exposure time.

When the diaphragm setting is changed by turning ring 5b, push rod 5 is shifted by cam 5a, for example in the direction of arrow B. This pivots lever 4 and its bolt 3 counterclockwise, thereby also pivoting lever 2 counterclockwise about its contact point with push rod 1. Measuring instrument 17 is thereby moved counterclockwise by an additional increment to compensate for resetting the diaphragm aperture.

By a proper selection of the transmission ratio of levers 2 and 4 the angular deflection of the exposure meter can be controlled in a precise and space-saving manner.

It is within the scope of the invention to compensate for changes in film sensitivity and/or filter factor in the same way. This can be done, for example, by moving either or both of the above-described push rods when adjusting for changes in these additional exposure factors.

The invention has been described in detail with particular reference to preferred embodiments thereof, but it will be understood that variations and modifications can be effected within the spirit and scope of the invention as described hereinabove and as defined in the appended claims.

I claim:

1. In a camera having first and second independently movable exposure factor setting members and a movable electric measuring instrument, means coupling said setting members to said instrument, comprising: a respective cam movable with each of said setting members; a push rod for each of said cams, one end of each push rod being maintained in sensing engagement with its respective cam; a first lever pivotally mounted about an axis fixed relative to said camera, said lever being in engagement with the other end of one of said push rods; a second lever dually pivoted on said first lever and on the other end of the second of said push rods; both axes of rotation of said second lever being perpendicular to the axis of rotation of the first lever; both of said levers being closely adjacent the face of the setting members; and flexible means coupling said second lever to said instrument for moving the latter in response to movement of said second lever about either of its pivots.

2. In a camera having first and second independently movable exposure factor setting members and a movable electric measuring instrument, means differentially interrelating said setting members and said instrument, comprising: a first lever mounted for pivotal movement about a first axis fixed relative to said camera; means for pivoting said first lever in response to movement of said first setting member; a second lever movable about second and third pivotal axes both said second and third axes being perpendicular said first axis; and both of said levers being located closely adjacent the face of the setting member; means for moving said second lever (a) about said second pivotal axis in response to movement of said second setting member; and (b) about said third pivotal axis in response to pivoting said first lever; and flexible means coupling said second lever to said instrument for moving the latter in response to the movement of said second lever about either of its pivotal axes.

3. The apparatus according to claim 2 and wherein said first and second levers are connected and said second pivotal axis passes through said connection, and wherein said means for moving said second lever about said second pivotal axis comprises cam means movable with said second setting member and a push rod operatively engaged with said cam means and with said second lever.

4. The apparatus according to claim 3 and wherein said third pivotal point is the connection between the push rod and the second lever, and wherein the means for moving said second lever about its third axis comprises cam means connected to said first setting member and push rod operatively engaged with said last-mentioned cam means and with said first lever.

References Cited by the Examiner

UNITED STATES PATENTS

| 2,887,026 | 5/1959 | Rentschler | 95—10 |
| 3,010,374 | 11/1961 | Hiruma | 95—10 |
| 3,126,800 | 3/1964 | Maas | 95—10 |

NORTON ANSHER, *Primary Examiner.*

WILLIAM E. JACKSON, *Assistant Examiner.*